United States Patent [19]

Doutt

[11] Patent Number: 4,650,152

[45] Date of Patent: Mar. 17, 1987

[54] AUTOMATIC SHUT-OFF VALVE FOR WELDING ELECTRODE COOLANT SYSTEMS

[76] Inventor: Kingsley A. Doutt, P.O. Box 888, Alpena, Mich. 49707

[21] Appl. No.: 863,728

[22] Filed: May 16, 1986

[51] Int. Cl.$^4$ ............................................. F16K 21/04
[52] U.S. Cl. ...................................... 251/16; 251/28; 251/18; 137/466
[58] Field of Search .................. 137/464, 466; 251/16, 251/18, 28

[56] References Cited

U.S. PATENT DOCUMENTS

| | | | |
|---|---|---|---|
| 2,707,484 | 5/1955 | Rush | 137/466 X |
| 2,765,801 | 10/1956 | Selim | 137/464 X |
| 2,796,080 | 6/1957 | Prequeil | 251/16 |

Primary Examiner—Harold W. Weakley
Attorney, Agent, or Firm—Harpman & Harpman

[57] ABSTRACT

A valve for controlling the flow of a liquid coolant in a circuit interconnecting several hollow welding electrodes with a pressurized coolant source has dual ball check valves in the supply and return lines respectively and a spring and pressure responsive device for holding the ball check valve in the supply line open when the fluid pressure of the coolant in the cooling circuit is maintained. The device is responsive in operation to loss of pressure in the coolant supply line and the hollow electrodes to permit the dual ball check valves to close upon a loss of pressure as occasioned by the burn out of one of the electrodes or the removal of the electrode from the circuit. The device may also originate an appropriate signal which may be directed to a remote electrical switch controlling the welding current.

10 Claims, 4 Drawing Figures

AUTOMATIC SHUT-OFF VALVE FOR WELDING ELECTRODE COOLANT SYSTEMS

BACKGROUND OF THE INVENTION

1. Technical Field

This invention relates to shut-off valves for controlling the flow of coolant liquid to several liquid cooled welding electrodes as used in robot welding applications and the like.

2. Description of the Prior Art

The automatic shut-off valve of the present invention operates when a substantial pressure difference occurs in a coolant supply line.

Prior art devices are disclosed is U.S. Pat. Nos. 1,775,773 and 3,431,375. The device of U.S. Pat. No. 1,775,773 incorporates a ball valve spring urged with respect to a valve seat, arranged to move an operating rod upon loss of pressure in the water line controlled, the operating rod directly actuating an electrical switch.

The U.S. Pat. No. 3,431,375 discloses a flow monitoring device that incorporates a valve with a by-pass around the valve and a piston movable in the by-pass for magnetically actuating a pressure indicating gauge. The valve comprises a valve element having a valve stem which may be adjustably positioned with respect to the valve seat. Neither of the devices of the U.S. Pat. Nos. 1,775,773 and 3,431,375 provide for the automatic action of dual fluid control valves acting to stop fluid flow through a controlled cooling circuit and the automatic valve upon the loss of pressure between the inlet and outlet ports of the valve such as occurs in the present invention.

SUMMARY OF THE INVENTION

Hollow water cooled welding electrodes as used in robot welders on assembly lines wherein various metal articles are automatically welded to one another are supplied with a coolant fluid to substantially improve their useful life and insure successful welding of the work pieces the welding electrodes engage. Heretofore the burn out of a hollow electrode or a rupture of the coolant supply line with which the hollow electrode communicates has resulted in the disruption of coolant with respect to other hollow electrodes in the same cooling circuit and the multiple failure of such electrodes and the resulting failure to weld the various work pieces to one another. Heretofore such welding systems have been dependent upon manual observation of the failure of the electrodes which usually resulted in the lack of welds or incomplete welds of the several work pieces and the need of shutting down the assembly line to correct the problem before production could be resumed.

The present invention provides an automatic shut-off valve for such coolant circuits which may be manually or remotely actuated and which will operate to shut off the coolant flow in the circuit immediately upon the rupture of a hollow welding electrode or break in a coolant line and simultaneously initiate a signal useful in shutting off the welding current to the several welding electrodes and provideing an audible or visual signal of such action whereby the loss of a number of the welding electrodes and the resultant lack of welds of the work piece is eliminated.

The automatic shut-off valve incorporates a pair of ball check valves in the supply and return lines of the coolant circuit and a device including a shaft for moving the ball check valve in the supply line to open position where it is frictionally held by a combination of spring and pressure means so long as the fluid pressure in the supply and return lines remains within a given range. The valve may be remotely actuated to open position.

DESCRIPTION OF THE PREFERRED EMBODIMENT

Figure 1:
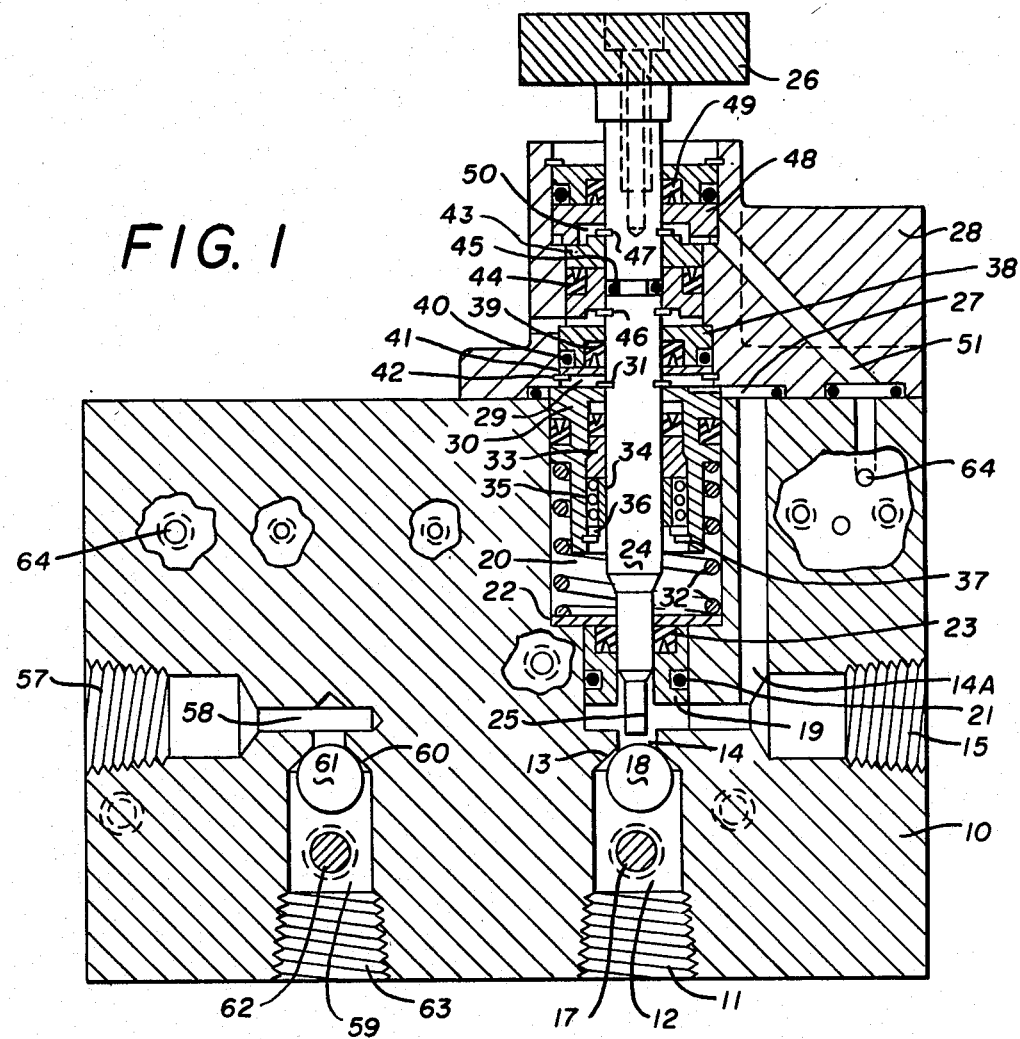
FIG. 1 is a vertical section through the automatic shut-off valve on line 1—1 of FIG. 2.
Figure 3:
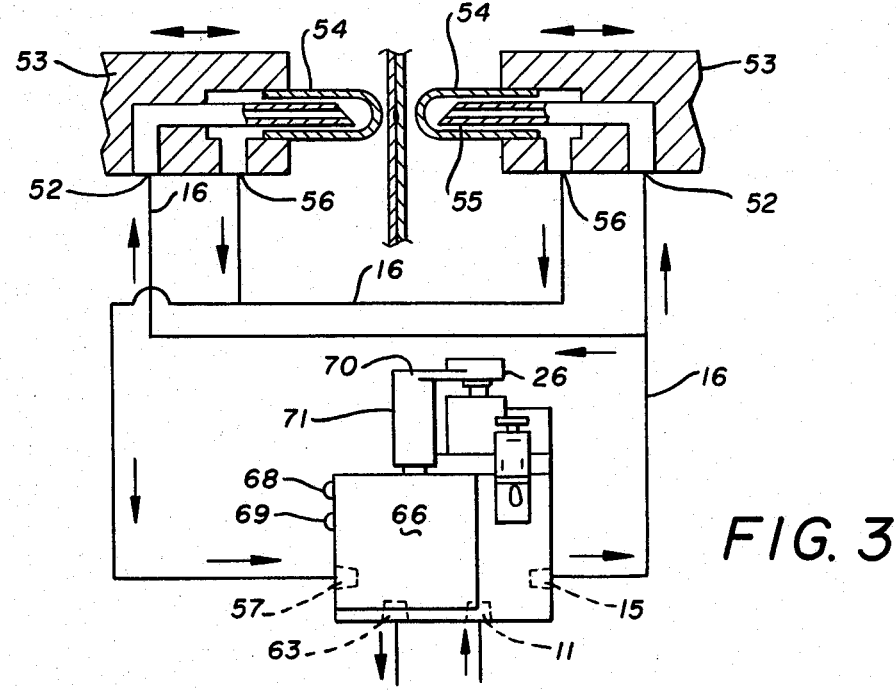
FIG. 3 is a diagrammatic illustration incorporating the shut-off valve, coolant conveying lines communicating therewith and with a pair of hollow electrodes in a welding gun.

By referring to FIG. 1 of the drawings, a valve body 10 is shown in vertical section having an inlet port 11 for a source of coolant liquid under pressure therein communicating with a first chamber 12 having a valve seat 13 in its upper portion controlling a passageway 14 which communicates with an outlet port 15 to a coolant circuit line 16, see FIG. 3, with which a plurality of hollow welding electrodes communicate.

A bar 17 is positioned across the first chamber 12 so as to cage a first ball valve element 18 in movable relation to the valve seat 13. The passageway 14 extends upwardly through a fitting 19 which is positioned in sealing relation in a lower portion of a second chamber 20 by an O-ring 21. A washer 22 is positioned in the upper portion of the second chamber 20 immediately above a resilient seal 23 in the fitting 19 and engaging a shaft 24 positioned for vertical movement in the second chamber 20. The shaft 24 has a lowermost portion 25 of reduced diameter of a length sufficient to engage the first ball valve element 18 and move it downwardly and away from the valve seat 13 when the shaft 24 is moved downwardly by motion imparted a palm button 26 on the upper end of the shaft 24 or by pneumatic pressure as hereinafter described, when the valve is remotely actuated.

Still referring to FIG. 1 of the drawings, it will be seen that the passageway 14 has a vertical extension 14A which extends to the upper surface of the body 10 and communicates with a recess 27 in a cap 28 mounted on the body 10, the recess 27 communicates with a third chamber 29 in the cap 28 through which the upper portion of the shaft 24 extends. A first piston 30 is positioned in the upper portion of the second chamber 20 and a snap ring 31 engaged in the shaft 24 is shown in engagement with the upper surface of the first piston 30, the area above the upper surface of the first piston 30 being in the lower portion of the third chamber 29 communicates with the recess 27 and therefore with fluid under pressure in the inlet port 11, the passageways 14 and 14A and when the first ball valve element 18 is moved away from the valve seat 13 by the lower portion 25 of the shaft 24, the fluid pressure will urge the first piston 30 downwardly along the shaft 24, it being observed that such downward movement is opposed by a coil spring 32. The first piston 30 is hollow and its inner diameter is larger than the diamter of the shaft 24, and a Teflon bushing 33 with an annular shoulder thereabout is positioned against the inner wall of the first piston 30. So that downward movement of the first piston 30 will move the shaft 24 downwardly, a sleeve 34 in the first piston 30 is frictionally engaged on the shaft 24 by a plurality of resilient O-rings 35.

The O-rings 35 are positioned within the first piston 30 by a secondary washer 36 and a secondary snap ring 37 and it will occur to those skilled in the art that by changing the thickness and/or the density of the materials of the sleeve 34, the degree of frictional engagement between the first piston 30 and the shaft 24 may be predetermined. For example, when the fluid coolant is present in the inlet port 11, the fluid circuit 16 and the third chamber 29 of the automatic shut-off valve at a pressure of 50 PSI, the frictional engagement between the first piston 30 and the shaft 24 is sufficient to hold the shaft 24 downwardly with its lower portion 25 engaging the first ball valve element 18 and hold it away from the valve seat 13.

Still referring to FIG. 1 of the drawings, it will be seen that a second fitting 38 is positioned in the third chamber 29 and positions a resilient seal 39 and an O-ring 40 between the shaft 24 and the wall of the third chamber 29 while permitting movement of the shaft 24 relative thereto. A washer 41 and snap ring 42 secure the secondary fitting 38 in the cap 28. A second piston 43 is formed of a pair of annular fittings and includes a seal 44. An O-ring 45 is positioned in a recess in the shaft 24 and engages the secondary piston 43. A snap ring 46 engaged on the shaft 24 adjacent the second piston 43 acts to move the second piston 43 upwardly when the shaft 24 moves upwardly as occurs upon loss of pressure in the outlet port 15, the vertical extension 14A of the passageway 14 and the third chamber 29, such vertical movement being occasioned by the coil spring 32. Another snap ring 47 engaging the shaft 34 immediately above the second piston 43 holds the same in fixed position thereon and a third fitting 48 abutting a seal housing 49 in the cap 28 defines a fourth chamber 50 which communicates with a diagonally positioned air passageway 51 as hereinafter described.

By referring now to FIG. 3 of the drawings, it will be seen that the fluid circuit 16 shown in communication with the outlet port 15 of the valve body 10 extends to the inlet ports 52 of two or more hollow welding electrode supporting members 53 which are usually termed welding guns and that the coolant is delivered into hollow electrodes 54 by a tubular member 55 in the welding gun body member 53 so as to be directed toward the actual workpiece contacting areas of the hollow welding electrodes 54. The coolant flows backwardly around the tubular members 55 and leaves the welding gun body members 53 by outlet ports 56 which communicate with the return portions of the fluid circuit lines 16 as indicated by the directional arrows in FIG. 3 of the drawings.

The return portion of the fluid circuit 16 communicates with a return line inlet port 57 in the body 10 of the automatic shut-off valve and communicates with a return passageway 58 therein as best seen in FIG. 1 of the drawings.

By referring to FIG. 1 of the drawings, it will be seen that the return pasageway 58 communicates with a chamber 59 by way of a valve seat 60 and that a second ball valve element 61 is positioned in the chamber 59 and retained therein by a bar 62 and adapted to move upwardly into engagement with the valve seat 60 when the fluid pressure in the return chamber 58 is less than the pressure in the chamber 59 and a return outlet port 63 which communicates with the coolant fluid supply source, not shown.

It will be seen that the first ball valve element 18 and the second ball valve element 61 comprise the dual ball check valves in the fluid coolant circuit in which the automatic shut-off valve is used.

In operation, operating pressure is established in the source of fluid coolant, not shown, in communication with the inlet port 11 of the automatic shut-off valve as hereinbefore described. The first ball valve element 18 closes and in order to establish communication of the fluid coolant through the fluid coolant circuit 16, the palm button 26 is depressed manually whereupon the shaft 24 is moved downwardly along with the second piston 43 and the first piston 30 which are engaged by the snap rings 47 and 31, respectively; thus compressing the coil spring 32 until the lower portion 25 of the shaft 24 engages the first ball valve element 18 and moves it downwardly and away from the valve seat 13 whereupon the fluid coolant enters the passageways 14 and 14A and the third chamber 29 and exerts downward pressure on the first piston 30 sufficiently to overcome the tension of the compressed coil spring 32 whereupon the first piston 30 moves downwardly and by reason of its frictional engagement on the shaft 24 slides downwardly thereon so as to reposition itself relative thereto. The palm button 26 may then be released and the coolant fluid will flow through the inlet port 11, the chamber 12, the passageway 14, the outlet port 15 and through the fluid coolant circuit 16 and the hollow welding electrodes 54 as hereinafter described and will return through the fluid coolant circuit communication lines to the return port 57 in the automatic shut-off valve where it communicates with the chamber 59 and moves the second ball valve element 61 downwardly and away from the valve seat 60. The fluid coolant leaves the automatic shut-off valve by way of the return port 63 which communicates with the fluid coolant supply source. The dual ball check valves 18 and 61 are thus open and the fluid coolant flows through the fluid coolant circuit to the several hollow welding electrodes. Upon the failure of one of the hollow welding electrodes or a rupture of the flexible hoses and/or tubes forming the fluid coolant circuit lines 16, the drop in pressure resulting from such a rupture reduces the pressure in the outlet port 15, the second chamber 20, the vertical passageway 14A and the recess 27 in the cap 28 which forms the third chamber 29 and thus permits the coil spring 32 to move the first piston 30 upwardly from its pressurized position hereinbefore described, the frictional engagement of the sleeve 34 in the first piston 30 frictionally engages the shaft 24 sufficiently to move it upwardly so that its lower portion 25 moves away from the first ball valve element 18 and permits the same to engage the valve seat 13 responsive to the fluid coolant pressure in the inlet port 11.

As illustrated in FIG. 1 of the drawings, the first piston 30 has been moved upwardly by the coil spring 32 to its uppermost position as determined by its engagement with the cap 28 around the recess 27 therein. The fluid pressure drop extends through the fluid coolant circuit 16 to the return line inlet port 57 whereupon the second ball valve element 61 will move into engagement with the valve seat 60 thus closing off the particular fluid coolant circuit in which the automatic shut-off valve is positioned with respect to the source of fluid coolant, not shown, which is usually supplying a number of other fluid coolant circuits. When the first piston 30 moves the shaft 24 upwardly as hereinbefore described, the second piston 43 in the cap 28 is engaged by the third snap ring 46 and moved upwardly into the fourth chamber 50, air pressure in the fourth chamber 50 is increased and vents by way of the diagonally positioned passageway 51 in the cap 28 with an extension 64 thereof which, as may be seen in FIG. 2 of the drawings, communicates with a manually or electrically operated (solenoid) three-way air valve 65 which is electrically connected with the electrical circuit energizing the hollow welding electrodes 54 and acts to control the welding circuit.

The valve 65 and a micro switch are located in a switch box 66 attached to the front of the automatic shut-off valve body 10. The box 66 is provided with a removable cover 67 and electrical circuits, not shown, extend from the box 66 to appropriate control switches, not shown, in the electric circuit normally energizing the hollow welding electrodes 54, as will be understood by those skilled in the art.

Figure 4:
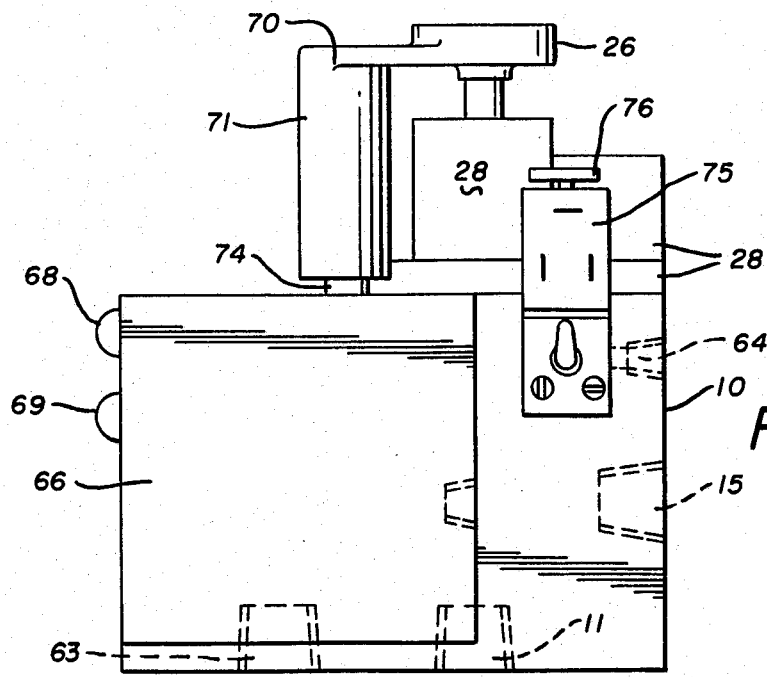
FIG. 4 is a front elevation of the automatic shut-off valve shown in FIGS. 1,2 and 3 of the drawings.
Figure 2:
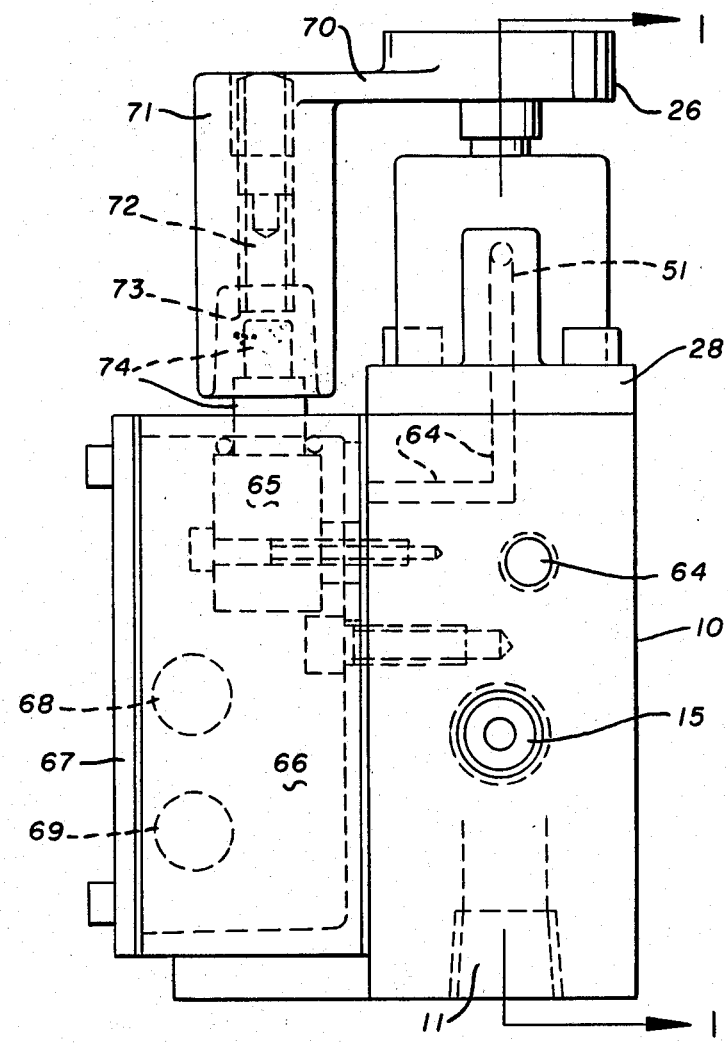
FIG. 2 is a side elevation of the automatic shut-off valve seen in FIG. 1.

In FIGS. 2,3 and 4 of the drawings, pilot lights, which are red and green in color, are indicated by the numerals 68 and 69 respectively and are provided to visually indicate the open or closed positions of the dual check valves in the automatic shut-off valve comprising the invention.

By referring to FIGS. 2 and 4, it will be seen that the palm button 26 which is connected to the upper end of the shaft 24 of the automatic shut-off valve has an angularly positioned sidewardly extending arm 70 and that a depending body member 71 is positioned on the outer end of the arm 70 where it is positioned over a vertically adjustable body 72 in a bore 73, the lower portion of the bore 73 being enlarged and adapted to enclose the actuating member 74 of the air valve 65. Those skilled in the art will thus observe that manual motion imparted the palm button 26 will, in addition to reopening the fluid coolant flow through the automatic shut-off valve as herein described, actuate the air valve 65 which acts to control the switches such as solenoid relay switches, not shown, in the electric welding circuit supplying the hollow welding electrodes.

In the foregoing description of the preferred embodiment, a suitable supply source of the fluid coolant referred to should be capable of supplying fluid coolant at from 25 to 60 PSI with a 50 PSI as a workable average. The return fluid pressure from the welding electrodes and the automatic shut-off valve for welding electrodes may be from 15 to 40 PSI and a 10 PSI pressure differential is sufficient to cool the welding electrodes when the sleeve 34 is arranged for a satisfactory frictional engagement with the shaft 24 of the valve, all as hereinbefore described.

The sleeve 34, which is preferably plastic, may be adapted to a desired operating pressure by varying the size of the bore therethrough which frictionally engages the shaft 24 or the sleeve 34 may be adjusted by changing the diameter of the O-rings 35 thereabout which change the degree of the frictional engagement of the sleeve 34 on the shaft 24. The automatic shut-off valve is thus adaptable to various existing fluid coolant supply systems as used in industry in connection with cooling hollow weldling electrodes and the like.

The automatic shut-off valve for welding electrode coolant systems is capable of either manual actuation or remote automatic actuation. For such remote actuation, a source of air pressure is placed in communication with the three-way air valve 65 and a wired remote control switch is electrically connected by suitable conductors to the device by a terminal 75 as seen in FIG. 4 of the drawings. Actuation of the three-way air valve 65 may be manual by way of a valve button 76 which acts to introduce air pressure into the air passageways 51 and 64 as best seen in FIGS. 1 and 2 of the drawings, and by referring to FIG. 1 in particular, it will be seen that such increased air pressure so introduced will be delivered to the fourth chamber 50 in the cap 28 of the automatic shut-off valve where it will move the second piston 43 and the shaft 24 and the first piston 30 downwardly compressing the coil spring 32 and moving the lower portion 25 of the shaft 24 into engagement with the first ball valve element 18 so as to move it away from the valve seat 13 and introduce fluid pressure into the fluid coolant circuit 16. The solenoid operated three-way air valve 65 being subjected to the same pressure increase, reconnects the electric control circuit therethrough by the electric switches so that the electric welding circuit to the hollow welding electrodes is re-established.

It will be seen that whether the automatic shut-off valve of the invention is remotely actuated or mechanically actuated as hereinbefore described, it will remain immediately responsive to a loss of fluid pressure in the fluid coolant circuit 16 and thus provide the desirable protection of a multiplicity of hollow welding electrodes in a welding environment, such as a robot installation in a manufacturing assembly line wherein many of the electrodes are so positioned during the work cycle that visual obesrvation of their condition is very difficult.

Having thus described my invention, what I claim is:

1. A shut-off valve responsive to variations in pressure in a coolant circulating system including a source of fluid coolant under pressure, said shut-off valve comprising a valve body having a bore therethrough and inlet and outlet ports communicating with said bore, a valve seat in said bore between said inlet and outlet ports and a valve element in said bore downstream of said valve seat and movable toward and away from said valve seat, a piston in said bore upstream of said valve seat and spring means urging said piston away from said valve seat, a shaft movably positioned axially of said bore and through said piston and means in said piston frictionally engaging said shaft, one end of said shaft positioned for movement through said valve seat against said valve element to move said valve element downstream away from said valve seat, an apertured cap on said valve body, an opposite end of said shaft extending out of said valve body and through said apertured cap, a passageway in said valve body communicating with said bore adjacent said outlet port and with said bore on the opposite side of said piston whereby fluid coolant in said bore and said outlet port engages said opposite side of said piston to move the same toward said valve seat against said spring means and whereby loss of fluid pressure in said bore and said outlet port allows said spring means to move said piston and said shaft away from said valve seat so that said valve element may engage said valve seat and shut off the flow of said fluid coolant through said shut-off valve.

2. The shut-off valve set forth in claim 1 and wherein said means in said piston frictionally engaging said shaft comprises a distortable sleeve.

3. The shut-off valve set forth in claim 1 and wherein said valve seat in said bore is of a known diameter and the diameter of said piston and said bore upstream of said valve seat in which said piston is positioned are of a greater diameter than said known diameter of said valve seat.

4. The shut-off valve set forth in claim 1 and wherein a secondary inlet and a secondary outlet and an interconnecting passageway are positioned in said valve body and adapted to be included in said coolant circulating system downstream therein with respect to said inlet and outlet ports and wherein a secondary valve seat is located in said connecting passageway and a secondary valve element is positioned for movement toward and away from said secondary valve seat, said secondary valve seat and said secondary valve seat and secondary valve element forming a check valve in said coolant circulating system.

5. The shut-off valve set forth in claim 1 and wherein a secondary bore is formed in said apertured cap in axial alignment with said bore in said valve body, said shaft extending through said secondary bore, a secondary piston in said secondary bore attached to said shaft for movement therewith, a portion of said secondary bore adjacent said secondary piston forming a pressure chamber and a secondary passageway in said cap and said valve body communicating with said pressure chamber whereby a secondary source of fluid pressure and a fluid pressure controlling device in communication with said secondary passageway will direct said secondary fluid pressure into said pressure chamber to move said secondary piston and said shaft through said valve seat against said valve element to move said valve element downstream away from said valve seat.

6. The shut-off valve set forth in claim 5 and wherein an electric circuit controlling switch in said controlling device in communication with said secondary passageway initiates a signal responsive to a change of pressure in said secondary bore occasioned by movement of said secondary piston therein.

7. The shut-off valve set forth in claim 1 and wherein said spring means comprises a compression spring engaging said piston.

8. The shut-off valve set forth in claim 1 and wherein said bore is vertically disposed in said valve body and said inlet port comprises the lower end of said bore and said valve seat is located inwardly thereof and wherein said outlet port is horizontally disposed in said valve body and communicates with said bore above said valve seat and below said piston.

9. The shut-off valve set forth in claim 1 and wherein a secondary bore is formed through said apertured cap in axial alignment with said bore in said valve body, said shaft extending through said secondary bore for manual engagement, a secondary piston in said secondary bore attached to said shaft for movement therewith, a portion of said secondary bore adjacent said secondary piston forming a pressure chamber, an electric circuit controlling pressure responsive electric switch in communication with said pressure chamber for initiating a signal responsive to change of pressure in said secondary bore occasioned by manual movement of said shaft and secondary piston.

10. The shut-off valve set forth in claim 1 and wherein a secondary bore is formed through said apertured cap in axial alignment with said bore in said valve body, said shaft extending through said secondary bore of manual engagement, a secondary piston in said secondary bore attached to said shaft for movement therewith, a portion of said secondary bore adjacent said secondary piston forming a pressure chamber, a passageway communicating with said pressure chamber, an air valve controlling said passageway, a source of air pressure in communication with said air valve, and means for operating said air valve whereby air pressure from said source may be directed into said pressure chamber to move said secondary piston and said shaft to move said valve element away from said valve seat and open the flow of said fluid coolant through said shut-off valve.

* * * * *